United States Patent
Liu et al.

(10) Patent No.: US 12,258,296 B1
(45) Date of Patent: Mar. 25, 2025

(54) SERPENTINE CARBON SEQUESTRATION FOAMED LIGHTWEIGHT SOIL AND PREPARATION METHOD THEREOF

(71) Applicant: Southeast University, Jiangsu (CN)

(72) Inventors: Songyu Liu, Jiangsu (CN); Xiang Zhang, Jiangsu (CN); Zhenyang Yuan, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 18/568,841

(22) PCT Filed: Feb. 10, 2023

(86) PCT No.: PCT/CN2023/075445
§ 371 (c)(1),
(2) Date: Dec. 11, 2023

(87) PCT Pub. No.: WO2024/156118
PCT Pub. Date: Aug. 2, 2024

(30) Foreign Application Priority Data

Jan. 29, 2023 (CN) .......................... 202310043677.2

(51) Int. Cl.
| | | |
|---|---|---|
| *C04B 18/12* | (2006.01) | |
| *C04B 14/04* | (2006.01) | |
| *C04B 14/36* | (2006.01) | |
| *C04B 24/04* | (2006.01) | |
| *C04B 24/12* | (2006.01) | |
| *C04B 28/10* | (2006.01) | |
| *C04B 38/10* | (2006.01) | |
| *C04B 103/48* | (2006.01) | |

(Continued)

(52) U.S. Cl.
CPC .......... *C04B 28/105* (2013.01); *C04B 14/042* (2013.01); *C04B 14/361* (2013.01); *C04B 24/04* (2013.01); *C04B 24/123* (2013.01); *C04B 38/103* (2013.01); *C04B 2103/48* (2013.01);
(Continued)

(58) Field of Classification Search
CPC ... C04B 28/105; C04B 14/042; C04B 14/361; C04B 24/04; C04B 24/123; C04B 38/103; C04B 2103/48; C04B 2111/00017; C04B 2111/00732; C04B 2111/40; Y02C 20/00;
(Continued)

(56) References Cited

U.S. PATENT DOCUMENTS

2013/0209339 A1   8/2013  Park et al.
2024/0209261 A1*  6/2024  Liu ........................ C09K 17/10

FOREIGN PATENT DOCUMENTS

CN   103582611    2/2014
CN   109399675    3/2019
(Continued)

OTHER PUBLICATIONS

"International Search Report (Form PCT/ISA/210) of PCT/CN2023/075445," mailed on Jun. 15, 2023, pp. 1-3.
(Continued)

*Primary Examiner* — Anthony J Green
*Assistant Examiner* — Marites A Guino-O Uzzle
(74) *Attorney, Agent, or Firm* — JCIPRNET

(57) ABSTRACT

The disclosure belongs to the technical field of materials for civil construction engineering, and specifically relates to a green and low carbon emission foamed lightweight soil prepared by using serpentine, magnesium oxide and $CO_2$ as raw materials. In the serpentine carbon sequestration foamed lightweight soil, the ingredients of raw material include: magnesium oxide, serpentine, a filler, $CO_2$ bubbles and water.

7 Claims, 1 Drawing Sheet

(51) Int. Cl.
C04B 111/00 (2006.01)
C04B 111/40 (2006.01)

(52) U.S. Cl.
CPC ............... C04B 2111/00017 (2013.01); C04B 2111/00732 (2013.01); C04B 2111/40 (2013.01)

(58) Field of Classification Search
CPC ........ Y02C 20/40; Y02P 10/10; Y02P 10/122; Y02W 30/91
See application file for complete search history.

(56) References Cited

FOREIGN PATENT DOCUMENTS

| | | | | |
|---|---|---|---|---|
| CN | 113264751 | 8/2021 | | |
| CN | 113816631 | 12/2021 | | |
| CN | 113968711 | 1/2022 | | |
| CN | 113968711 A | * 1/2022 | ............. | C04B 14/10 |
| CN | 114699907 | 7/2022 | | |
| CN | 114920245 | 8/2022 | | |
| CN | 115504811 | 12/2022 | | |
| EP | 2478951 A1 | * 7/2012 | ............. | B01D 53/62 |

OTHER PUBLICATIONS

Wang Zhong, "Designing and Evaluating the Early Implementation Schemes of Carbon Dioxide Capture and Storage (CCS) in China", Sichuan University Press, Jul. 2020, with English translation, pp. 1-3.

Cai Guang-Hua et al., " A Review of Research into C02 Carbonation Technology", Journal of Nanjing Institute of Technology(Natural Science Edition), vol. 15, Issue 1, Mar. 2017, with English abstract, pp. 1-11.

* cited by examiner

SERPENTINE CARBON SEQUESTRATION FOAMED LIGHTWEIGHT SOIL AND PREPARATION METHOD THEREOF

CROSS-REFERENCE TO RELATED APPLICATION

This application is a 371 application of International PCT application serial no. PCT/CN2023/075445 filed on Feb. 10, 2023, which claims the priority benefit of China application no. 202310043677.2 filed on Jan. 29, 2023. The entirety of each of the above mentioned patent applications is hereby incorporated by reference herein and made a part of this specification.

TECHNICAL FIELD

The disclosure belongs to the technical field of materials for civil construction engineering, and specifically relates to a green, environmentally friendly, emission-reducing and carbon sequestration foamed lightweight soil prepared by using serpentine, magnesium oxide and $CO_2$ as raw materials and a preparation method thereof.

DESCRIPTION OF RELATED ART

Foamed lightweight soil is a light and porous soil made by adding the foam generated by the foaming agent to a slurry made of a curing agent, an additive and water in a specific proportion, and then subjected to mixing, pouring, natural curing or steam curing. Because foamed lightweight soil has low elastic modulus, good shock absorption, high fluidity, good heat-proofing and sound-proofing effects, and high strength adjustability, foamed lightweight soil is commonly adopted in constructions such as bridge abutment backfill, road widening, steep slope embankments, landslide subgrade load reduction, and soft soil subgrade load reduction.

Carbon sequestration technology through the use of magnesium oxide is characterized in low calcination temperature, recyclable $CO_2$ during the production process, and rapid increase in strength. In the application of carbon sequestration technology with the use of magnesium oxide to soil reinforcement, it is found that the strength of solidified soil processed through carbon sequestration technology with the use of magnesium oxide increases with the carbon sequestration time. Moreover, the solidified soil under carbonization performed for 3 hours to 6 hours is able to have the strength of cement soil solidified for 28 days. In addition, solidified soil processed through carbon sequestration with the use of magnesium oxide has better resistance to effects of dry-wet cycles, freeze-thaw cycles, as well as better resistance to sulfate erosion.

China has abundant serpentine reserves, but utilization of serpentine will cause production of a large amount of waste tailings. The content of magnesium accounts for almost half of serpentine. If the serpentine tailings can be ground into fine powder to partially replace the magnesium oxide to prepare foamed lightweight soil, waste resources may be recycled, and energy consumption may be more significantly reduced as compared to the existing acid extraction and recycling method of serpentine tailings, thereby decreasing environmental pollution.

SUMMARY

The purpose of the present disclosure is to provide a carbon sequestration foamed lightweight soil which is green, environmentally friendly, and energy-saving and is prepared by using serpentine, magnesium oxide and carbon dioxide as raw materials as well as a preparation method thereof. By using serpentine and magnesium oxide together as cementing materials to replace the cement used in conventional foamed lightweight soil, the present disclosure is able to realize rapid increase in strength, high construction efficiency, low carbon emission and environmental protection, as well as waste resource recycling, thereby satisfying the demand for resource utilization of carbon dioxide and serpentine tailings, and conforming to the development trend of green construction in civil engineering.

In view of the low efficiency of $CO_2$ in resource utilization and the lack of effective utilization of serpentine tailings waste accumulation, combined with magnesium oxide carbonization technology, the present disclosure grinds serpentine tailings to replace part of magnesium oxide as cementing material. In the meantime, the ground serpentine tailings replace part of the raw soil to serve as a skeleton, and $CO_2$ foaming is adopted to prepare foamed lightweight soil, which may be used in roadbeds, cavities or areas that need to be backfilled to achieve recovery and recycling of $CO_2$ and the resource utilization of serpentine tailings.

In order to achieve the above purpose, the present disclosure adopts the following technical solutions.

In the serpentine carbon sequestration foamed lightweight soil, the ingredients of raw material include: 10 to 100 parts by weight of magnesium oxide, 10 to 100 parts by weight of filler, 10 to 100 parts by weight of serpentine, 2 to 45 parts by weight of $CO_2$ bubbles and 20 to 400 parts by weight of water.

Preferably, the serpentine is one or a mixture of two of serpentine tailings or serpentine ore. More preferably, the serpentine tailings are crushed, ground and filtered through a 0.075 mm sieve.

Preferably, the magnesium oxide is light magnesium oxide or heavy magnesium oxide or a mixture of the two.

Preferably, the filler includes raw soil. The raw soil may be engineering waste soil, or sandy soil, silt soil and clay soil. The raw soil is air-dried, crushed and filtered through a 2 mm sieve. As for raw soil that does not meet the requirements, mud dissolution and necessary screening should be carried out in advance.

Preferably, the foaming agent used in the $CO_2$ bubbles is any one of rosin resin (rosin soap foaming agent, etc.), synthetic surfactants (sodium laureth sulfate, sodium dodecyl-benzene-sulfonate, etc.), protein (vegetable protein and animal protein foaming agents), composite foaming agents (plant-derived composite foaming agents, etc.) or mixtures of the above. When using rosin resin and synthetic surfactant foaming agents, an appropriate amount of active agent and foam stabilizer may be mixed depending on the circumstances. The foam stabilizer is magnesium acetate. By using the pre-foaming method, an air compressor is adopted to introduce high-purity $CO_2$ to produce bubbles.

The water is tap water, purified water or distilled water, including the water used by the $CO_2$ bubbles.

The disclosure also provides a method for preparing the foamed lightweight soil as described above, which includes the following steps.

S1. Preparing raw materials, including preparing and weighing 10 to 100 parts by weight of serpentine, 10 to 100 parts by weight of magnesium oxide, 10 to 100 parts by weight of filler and 20 to 400 parts by weight of water for use later;

S2. Preparing slurry: Placing the serpentine, magnesium oxide, and filler into a mixing device in proportion, and stirring at a speed of 100 r/min for 1 minute to 2 minutes to mix the serpentine, magnesium oxide, and the filler uniformly to obtain the mixture, adding water to the mixture 2 times or 3 times, stirring for 1 minute to 2 minutes after each addition of water, and keeping the powder from sinking to the bottom or agglomerating to ensure that the slurry is uniform and has no sedimentation until all of the water is completely added, and obtaining the slurry;

S3. Preparing $CO_2$ bubbles: Diluting the foaming agent at a dilution factor of 20 times to 60 times, adding an active agent and a foam stabilizer, and mixing them to obtain a foaming liquid; then connecting to the $CO_2$ cylinder through a trachea, opening the $CO_2$ vent valve and adjusting the pressure to 400 kPa. After the air in the foaming liquid pipeline is exhausted, and the foaming liquid completely enters the water pump, the foaming device is closed after the pressure is stable and the foaming rate is stable. The foam outlet valve is opened. Different maximum acceleration ratios are adopted for water pumps depending on different foaming agents and different foaming agent dilution proportions. The pressure and water pump speed ratio are adjusted according to the demand. The pressure is controlled with a range from 100 kPa to 400 kPa, the water pump speed ratio is 20 to 80, and the corresponding water pump flow is 1 L/min to 4 L/min. Fine and stable $CO_2$ foam is released, and the preparation is complete, and a container is used to collect the $CO_2$ foam and set aside for use;

S4. Mixing and stirring: Adding 2 parts by weight to 45 parts by weight of $CO_2$ bubbles into the slurry for stirring. The stirring speed is 600 r/min to 900 r/min. The stirring time should not be too long and generally ranges from 10 minutes to 12 minutes. Ensuring that the $CO_2$ bubbles are evenly distributed and the slurry has no sedimentation, then a good mixture is obtained; S5. Preparing and curing sample: Immediately pouring the blended mixture into the mold for sealing, and curing the mixture in a curing room at a constant temperature to obtain carbon sequestration foamed lightweight soil. The sample preparation from steps S4 to S5 must be completed within the half-life of the foaming agent to prevent the foam from bursting and causing $CO_2$ to leak.

In view of the problems that conventional bubble mixed light soil adopts cement as a curing agent and results in the emission of a large amount of $CO_2$, considerable amount of energy resource consumption, and the low utilization rate of serpentine resources in China, leading to the accumulation of a large amount of serpentine tailings that cannot be utilized, the present disclosure provides a preparation method of light soil through combining carbonization technology with use of magnesium oxide, aiming to provide a new operating method of serpentine carbon sequestration foamed lightweight soil, which helps to transform foundation treatment technology into a method that is green, environmentally friendly, energy-saving and having low carbon emission, able to achieve waste resource utilization, reduce carbon dioxide emissions and promote re-absorption and storage of carbon dioxide. The present disclosure selects serpentine and magnesium oxide as curing agents and carbon dioxide gas as raw materials for bubbles.

The present disclosure adopts magnesium oxide to replace conventional Portland cement, and replace part of the magnesium oxide with serpentine tailings to reduce the amount of magnesium oxide and realize waste resource utilization as well as reduce the amount of cement, and thereby reducing emissions of a large amounts of $CO_2$, dust, smoke, toxic gases and other substances in the cement industry production process in the hope to alleviate the greenhouse effect and reduce environmental pollution. During the preparation and maintenance process of foamed lightweight soil, a large amount of carbon dioxide (greenhouse gas) is used as the foaming gas, which provides a new way to reduce carbon emissions. Compared with conventional cement foamed lightweight soil, the serpentine carbon sequestration foamed lightweight soil of the present disclosure may be prepared in a short time, and has rapid increase in strength in the early stage. The present disclosure not only has the characteristics of energy saving, environmental protection, low carbon and high efficiency, but also meets the requirements for material properties in engineering construction, and also meets the requirements of sustainable development for current engineering construction.

The magnesium oxide used in the serpentine carbon sequestration foamed lightweight soil in the present disclosure undergoes hydration reactions and carbonization reactions during the preparation process, which will cause volume expansion. Compared with conventional cement foamed lightweight soil which generates greater autogenous shrinkage and release a large amount of heat, the present disclosure mitigates internal surface temperature difference and autogenous shrinkage of the foamed lightweight soil, thereby reducing the risk of cracking of the engineering structure.

The serpentine foamed lightweight soil prepared by the disclosure has low density and is lightweight, able to reduce the load on buildings and reduce additional stress, and may be used in special high-demand projects to improve project safety.

DESCRIPTION OF THE EMBODIMENTS

Figure 1:
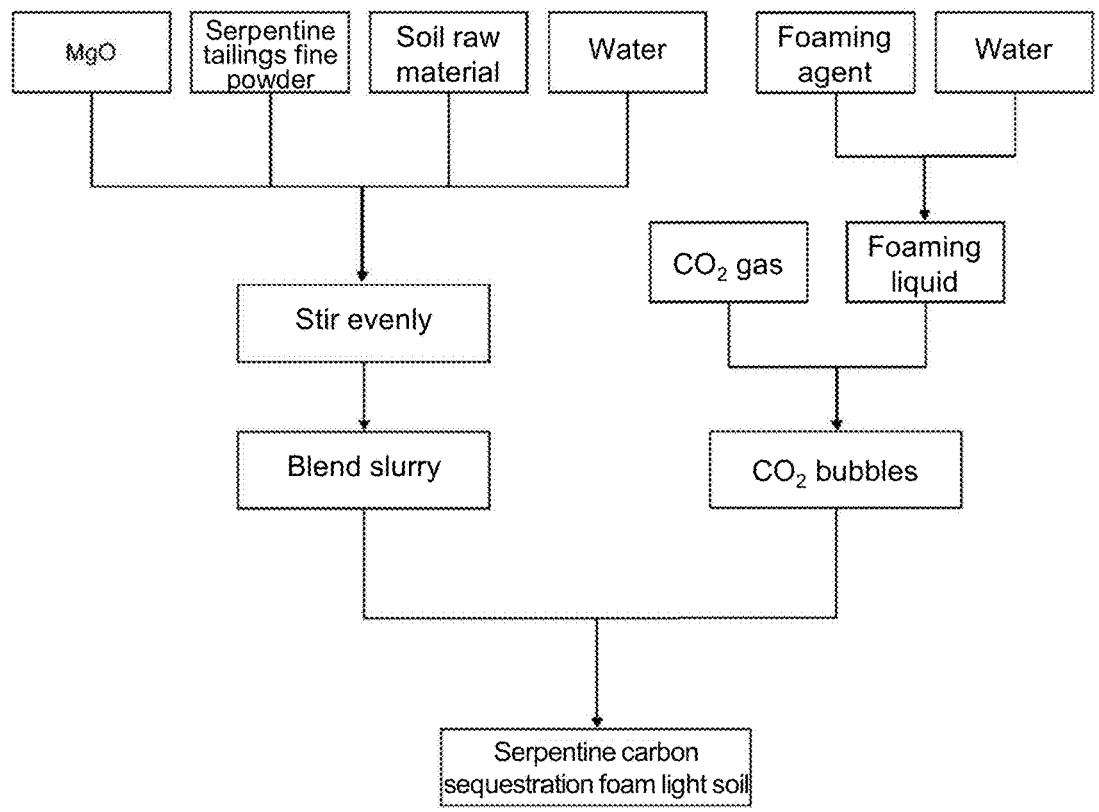
FIG. 1 is a schematic view of a preparation method of a serpentine carbon sequestration foamed lightweight soil of the present disclosure.

In order to facilitate understanding of the present disclosure, the content of the present disclosure will be further explained below in conjunction with the examples, but the present disclosure is not limited only to the following examples. It should be understood that the specific embodiments described here are only used to explain the present disclosure and are not intended to limit the present disclosure.

In the following examples, the silty clay used was taken from a construction site in Nanjing. The basic indicators are shown in Table 1 and the basic properties are shown in Table 2. The active magnesium oxide used is low-active magnesium oxide produced by Hebei Meishen Technology Co., Ltd., wherein the iodine absorption value is 14, and the ingredients are shown in Table 2. The serpentine tailings used were taken from an experimental site of the Jiangsu Geological Survey Institute and ground by a ball mill, wherein the ingredients are shown in Table 2, and the particle size is <0.075 mm.

TABLE 1

Basic property indicators of silty clay

| Test items | Test value |
|---|---|
| Natural density $\rho/(g \cdot cm^{-3})$ | 1.88 |
| Natural moisture content, w/% | 33.3 |

TABLE 1-continued

Basic property indicators of silty clay

| Test items | Test value |
|---|---|
| Maximum dry density/(g · cm$^{-3}$) | 1.71 |
| Optimal moisture content/% | 17.4 |
| Liquid limit, $w_L$ (%) | 35.5 |
| Plastic limit, $w_p$ (%) | 19.8 |
| Specific gravity, $G_s$ | 2.71 |

TABLE 2

Main chemical ingredients of serpentine, magnesium oxide and silty clay

| Ingredients | MgO | Al$_2$O$_3$ | CaO | SiO$_2$ | Fe$_2$O$_3$ | Na$_2$O |
|---|---|---|---|---|---|---|
| Serpentine | 45.93 | 1.97 | 1.27 | 40.43 | 8.74 | 0.27 |
| Magnesium oxide | 98.68 | 0.06 | 0.06 | 0.50 | 0.10 | 0.38 |
| Silty clay | 3.032 | 16.99 | 3.43 | 65.85 | 5.11 | 1.47 |

Example 1

In a serpentine carbon sequestration foamed lightweight soil, each cubic meter of the serpentine carbon sequestration foamed lightweight soil contains: 100 parts by weight of active magnesium oxide powder, 100 parts by weight of silty clay, 60 parts by weight of serpentine tailings powder, 15 parts by weight of CO$_2$ bubbles and 170 parts by weight of water.

The silty clay needs to be air-dried first and then pulverized and filtered through a 2 mm sieve. The water used is distilled water, including the water used in the CO$_2$ bubbles.

0.375 parts by weight of sodium dodecyl sulfonate used as the foaming agent, 0.00375 parts by weight of magnesium acetate used as the foam stabilizer, and 0.00375 parts by weight of sodium cocoylglycinate used as the active agent were taken. The above ingredients were mixed and the foaming agent was diluted at a dilution factor of 40 to obtain 15 parts by weight of the foaming liquid whose foaming rate is 40 times and the half-life is 20 minutes to 40 minutes.

The following steps are adopted to prepare serpentine carbon sequestration foamed lightweight soil.

S1. Preparing raw materials: weighing 60 parts by weight of serpentine tailings powder, 100 parts by weight of active magnesium oxide powder, 100 parts by weight of silty clay for use later.

S2. Preparing slurry: Placing the serpentine tailings powder, active magnesium oxide powder, and silty clay into a mixing device in proportion, and stirring at a speed of 100 r/min for 2 minutes to mix the serpentine tailings powder, active magnesium oxide powder, and silty clay uniformly to obtain the mixture, adding water respectively to the mixture 2 times or 3 times, stirring for 1 minute to 2 minutes after each addition of water, and keeping the powder from sinking to the bottom or agglomerating to ensure that the slurry was uniform and had no sedimentation until all of the water was completely added, and obtaining the slurry.

S3. Preparing CO$_2$ bubbles: Diluting the foaming agent by adding water at a dilution factor of 40 times, adding an active agent and a foam stabilizer, and mixing them to obtain a foaming liquid; then connecting to the CO$_2$ cylinder through a trachea, opening the CO$_2$ vent valve and adjusting the pressure to 400 kPa. After the air in the foaming liquid pipeline was exhausted, and the foaming liquid completely entered the water pump, the foaming device was closed after the pressure is stable and the foaming rate is stable. The foam outlet valve was opened. The selected pressure size was 400 kPa, the water pump speed ratio was 60, and the water pump flow rate was 3 L/min. Fine and stable CO$_2$ foam was released, and a container was used to collect the CO$_2$ foam and set aside for use.

S4. Mixing and stirring: Adding 10 parts by weight of CO$_2$ bubbles into the slurry for stirring. The stirring speed was 800 r/min. The stirring time was 10 minutes. Ensuring that the CO$_2$ bubbles were evenly distributed and the slurry had no sedimentation, then a good mixture was obtained.

S5. Preparing and curing sample: Immediately pouring the blended mixture into the mold for sealing, and curing the mixture in a curing room at a constant temperature for 7 days to obtain carbon sequestration foamed lightweight soil. The sample preparation from steps S4 to S5 must be completed within the half-life of the foaming agent to prevent the foam from bursting and causing CO$_2$ to leak.

Example 2

In a serpentine carbon sequestration foamed lightweight soil, each cubic meter of the serpentine carbon sequestration foamed lightweight soil contains: 60 parts by weight of serpentine tailings powder, 100 parts by weight of active magnesium oxide powder, 100 parts by weight of silty clay, 10 parts by weight of CO$_2$ bubbles and 170 parts by weight of water. The same serpentine tailings powder, active magnesium oxide powder, silty clay, water and foaming agent used in Example 1 were used, and the treatment methods for various materials were also identical.

The preparation method of the serpentine carbon sequestration foamed lightweight soil in Example 2 is the same as that in Example 1, but the curing time is 14 days.

Example 3

In a serpentine carbon sequestration foamed lightweight soil, each cubic meter of the serpentine carbon sequestration foamed lightweight soil contains: 60 parts by weight of serpentine tailings powder, 100 parts by weight of active magnesium oxide powder, 100 parts by weight of silty clay, 10 parts by weight of CO$_2$ bubbles and 170 parts by weight of water. The same serpentine tailings powder, active magnesium oxide powder, silty clay, water and foaming agent used in Example 1 were used, and the treatment methods for various materials were also identical.

The preparation method of the serpentine carbon sequestration foamed lightweight soil in Example 3 is the same as that in Example 1, but the curing time is 28 days.

Comparative Example 1

In a serpentine carbon sequestration foamed lightweight soil, each cubic meter of the serpentine carbon sequestration foamed lightweight soil contains: 20 parts by weight of serpentine tailings powder, 100 parts by weight of active magnesium oxide powder, 100 parts by weight of silty clay, 10 parts by weight of CO$_2$ bubbles and 140 parts by weight of water. The same serpentine tailings powder, active magnesium oxide powder, silty clay, water and foaming agent used in Example 1 were used, and the treatment methods for various materials were also identical.

The preparation method of the serpentine carbon sequestration foamed lightweight soil in Comparative Example 1 is the same as that in Example 1, and the curing time is 7 days.

Comparative Example 2

In a serpentine carbon sequestration foamed lightweight soil, each cubic meter of the serpentine carbon sequestration foamed lightweight soil contains: 100 parts by weight of serpentine tailings powder, 100 parts by weight of active magnesium oxide powder, 100 parts by weight of silty clay, 10 parts by weight of $CO_2$ bubbles and 200 parts by weight of water. The same serpentine tailings powder, active magnesium oxide powder, silty clay, water and foaming agent used in Example 1 were used, and the treatment methods for various materials were also identical.

The preparation method of the serpentine carbon sequestration foamed lightweight soil in Comparative Example 2 is the same as that in Example 1, and the curing time is 7 days.

Comparative Example 3

In a serpentine carbon sequestration foamed lightweight soil, each cubic meter of the serpentine carbon sequestration foamed lightweight soil contains: 100 parts by weight of active magnesium oxide powder, 100 parts by weight of silty clay, 10 parts by weight of $CO_2$ bubbles and 130 parts by weight of water. The same active magnesium oxide powder, silty clay, water and foaming agent used in Example 1 were used, and the treatment methods for various materials were also identical. Comparative Example 3 was used as conventional carbon sequestration foamed lightweight soil without the serpentine powder.

Next, the samples prepared in the above examples were subjected to unconfined strength test and thermogravimetric analysis test.
1. Unconfined Strength Test and Inspection For the samples prepared in Examples 1, 2, and 3 and Comparative Examples 1, 2, and 3, the unconfined compressive strength test was conducted after 7 days of curing. The unconfined compressive strength test was conducted in accordance with the specification "Highway Geotechnical Test Regulations JTG E40-2007" through the user of a CBR-2 load-carrying ratio tester.
Unconfined Strength Test Results

TABLE 3

Properties of serpentine carbon sequestration foamed lightweight soil

| Sample | Content ratio of Serpentine | Curing time | Unconfined compressive strength (MPa) |
| --- | --- | --- | --- |
| Example 1 | 30% | 7 d | 0.660 |
| Example 2 | 30% | 14 d | 0.980 |
| Example 3 | 30% | 28 d | 1.409 |
| Comparative Example 1 | 10% | 28 d | 1.249 |
| Comparative Example 2 | 50% | 28 d | 0.845 |
| Comparative Example 3 | 0 | 28 d | 1.500 |

Strength Indicator

It can be seen from Table 3 that: through the content ratio of serpentine 10%, 30%, and 50% (serpentine tailings powder/active magnesium oxide powder+silty clay) in Comparative Example 1, Example 1 and Comparative Example 2, the 7-day unconfined compressive strength is 0.574 MPa, 0.660 MPa, and 0.600 MPa respectively. By increasing the content ratio of serpentine, the strength of the serpentine carbon sequestration foamed lightweight soil will be first increased and then reduced. There is a critical value for this content ratio, and the reason behind that is the strength of the serpentine carbon sequestration foamed lightweight soil is derived from the skeleton supporting function served by the magnesium carbonate generated by the hydration carbon sequestration reaction of active magnesium oxide and the filler. The increase in the content ratio of serpentine reduces the content of active magnesium oxide and increases the content $SiO_2$ in the mixture, making the strength of the sample increase when the content ratio of serpentine changes from 10% to 30%. The activity of MgO in serpentine tailings powder is lower than that in active magnesium oxide powder, which affects the formation of final magnesium carbonate, making the strength of the sample reduce when the content ratio of serpentine changes from 30% to 50%.

Through Comparative Example 3, it can be seen that after adding 30% serpentine powder, compared with the carbonized foamed lightweight soil without serpentine powder, the strength is not significantly reduced, and the serpentine carbon sequestration foamed lightweight soil does not require secondary carbonization throughout the process, and may be cured under ambient conditions in the air. Compared with carbonized foamed lightweight soil, the curing conditions are simple, a large amount of serpentine tailings is consumed, and the materials used are more environmentally friendly and more suitable for the construction on site.

Through Examples 1, 2, and 3, it can be seen that the unconfined compressive strength of the serpentine carbon sequestration foamed lightweight soil corresponding to 30% of content ratio of serpentine after 7 days, 14 days, and 28 days is 0.660 MPa, 0.980 MPa, and 1.409 MPa respectively. The strength of the serpentine carbon sequestration foamed lightweight soil increases with curing days, and the increase is significantly fast in the first 7 days, and the strength increases rapidly.
2. Thermogravimetric Analysis Test and Inspection The samples prepared in Examples 1, 2, 3 and Comparative Examples 1, 2, and 3 were subjected to thermogravimetric analysis tests using a TA-Q500 thermogravimetric analyzer. The temperature started from 30° C. and increased at a rate of 10° C./min to 1000° C.

Generally, the decarburization process of magnesium carbonate starts at 450° C. to 550° C. Therefore, during this heating stage, the higher the decline rate of the curve, the greater the escape rate of $CO_2$, and the stronger the carbon sequestration ability of the sample.

Figure 2:
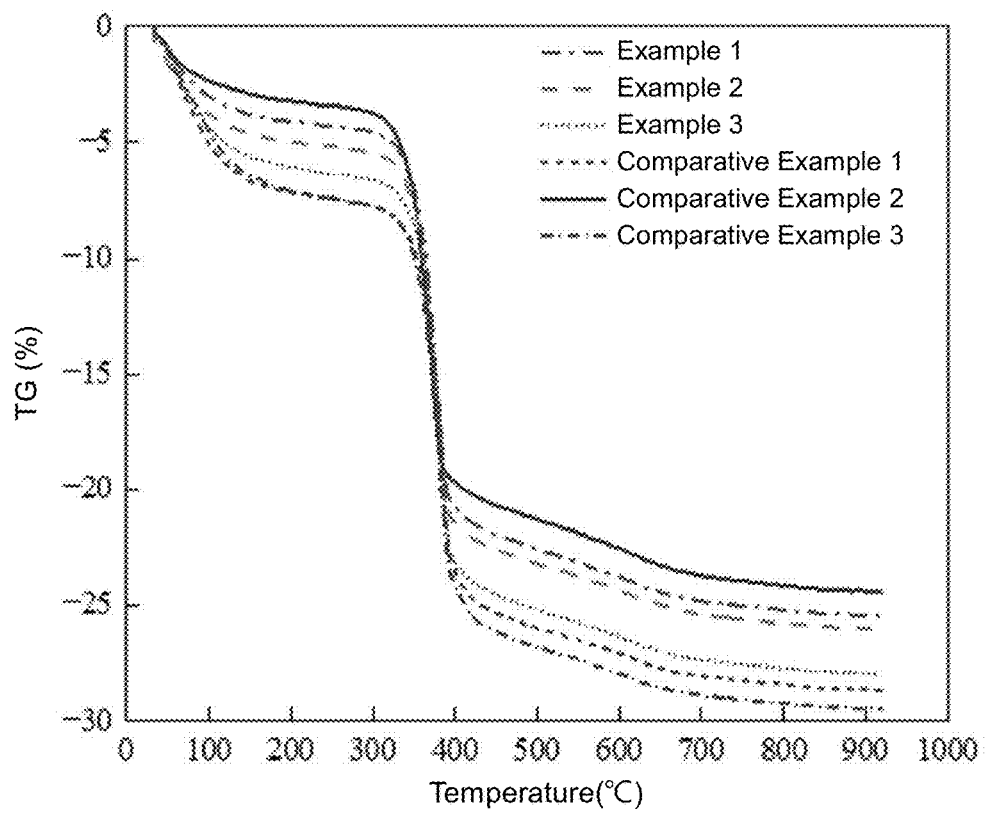
FIG. 2 shows a thermogravimetric analysis results of samples prepared in Examples and Comparative Examples.

As shown in FIG. 2, through the comparison of Examples 1, 2, and 3, it can be seen that as the curing age increases, the mass loss rate of the sample increases, indicating that the carbonization degree of the sample increases, which is basically consistent with the unconfined strength test results. Through comparison of Comparative Examples 1, 2, and 3, the carbonization degree of the sample without adding serpentine powder is relatively highest, indicating that the sample of Comparative Example 3 has the optimal carbon sequestration effect, but the cost is also the highest. Samples added with 10% and 50% of serpentine powder have relatively lower carbonization degree compared with the sample added with 30% of serpentine powder, the carbon sequestration effect is relatively poor, which is basically consistent with the unconfined strength test results.

Finally, the method of this disclosure is only a preferred embodiment and is not used to limit the protection scope of this disclosure. Any modifications, equivalent replacements, improvements, etc. made within the spirit and principles of this disclosure shall be included in the protection scope of this disclosure.

What is claimed is:

1. A serpentine carbon sequestration foamed lightweight soil, wherein ingredients of raw materials per cubic meter comprise: 10 to 100 parts by weight of magnesium oxide, 10 to 100 parts by weight of a filler, 10 to 100 parts by weight of serpentine, 2 to 45 parts by weight of $CO_2$ bubbles and 20 to 400 parts by weight of water,
   wherein a weight of the serpentine is 30% of a sum of a weight of the magnesium oxide and a weight of the filler,
   wherein a preparation method of the serpentine carbon sequestration foamed lightweight soil comprises following steps:
   S1, preparing the raw materials: weighing 10 to 100 parts by weight of the magnesium oxide, 10 to 100 parts by weight of the filler, 10 to 100 parts by weight of the serpentine, and 20 to 400 parts by weight of the water for use later;
   S2, preparing a slurry: placing the serpentine, the magnesium oxide, and the filler into a mixing device in proportion, and stirring at a speed of 100 r/min for 1 minute to 2 minutes to mix the serpentine, the magnesium oxide, and the filler uniformly to obtain a mixture, adding the water respectively to the mixture 2 times or 3 times, stirring for 1 minute to 2 minutes after each addition of the water, and keeping the mixture from sinking to the bottom or agglomerating to ensure that the slurry is uniform and has no sedimentation until all of the water is completely added, and obtaining the slurry;
   S3, preparing the $CO_2$ bubbles: adopting a pre-foaming method to use high-pressure $CO_2$ to produce the $CO_2$ bubbles, wherein the adopted $CO_2$ is industrial high-purity carbon dioxide or carbon dioxide purified from industrial waste gas;
   S4, mixing and stirring: adding 2 parts by weight to 45 parts by weight of the $CO_2$ bubbles into the slurry obtained from the step S2 for stirring, and ensuring that the $CO_2$ bubbles are evenly distributed and the slurry has no sedimentation, then a good mixture is obtained, wherein a stirring speed is 600 r/min to 900 r/min, a stirring time is 10 minutes to 12 minutes; and
   S5, preparing and curing a sample: pouring the blended mixture into a mold for sealing, and curing the mixture in a curing room at a constant temperature to obtain the carbon sequestration foamed lightweight soil.

2. The serpentine carbon sequestration foamed lightweight soil according to claim 1, wherein the serpentine is serpentine tailings or a serpentine ore, or a mixture of the two.

3. The serpentine carbon sequestration foamed lightweight soil according to claim 1, wherein the magnesium oxide is light magnesium oxide or heavy magnesium oxide or a mixture of the two.

4. The serpentine carbon sequestration foamed lightweight soil according to claim 1, wherein the filler is engineering waste soil, sandy soil, silt soil or clay soil.

5. The serpentine carbon sequestration foamed lightweight soil according to claim 1, wherein raw materials of the $CO_2$ bubbles comprise 0.33 to 20 parts by weight of a foaming agent, 0.0033 to 2 parts by weight of a foam stabilizer and 0.0033 to 2 parts by weight of an active agent; the foaming agent is one of a rosin resin, a synthetic surfactant, protein, and a composite foaming agent or a mixture of the above; the foam stabilizer is magnesium acetate; the active agent is sodium cocoyl glycinate, potassium cocoyl glycinate, lauroyl glutamic acid or potassium cocoyl glutamate.

6. The serpentine carbon sequestration foamed lightweight soil according to claim 5, wherein in the step S3, the method of preparing the $CO_2$ bubbles is as follows:
   diluting the foaming agent at a dilution factor of 20 times to 60 times, adding the active agent and the foam stabilizer, and mixing them to obtain a foaming liquid;
   then connecting to a $CO_2$ cylinder through a trachea, opening a $CO_2$ vent valve and adjusting a pressure to 400 kPa, after air in a foaming liquid pipeline is exhausted, and the foaming liquid completely enters a water pump, a foaming device is closed after the pressure is stable and a foaming rate is stable; and
   opening a foam outlet valve to control the pressure with a range from 100 kPa to 400 kPa, a water pump speed ratio from 20 to 80, and a corresponding water pump flow from 1 L/min to 4 L/min, to release fine and stable $CO_2$ foam, and the preparation is complete, and a container is used to collect $CO_2$ foam and set the $CO_2$ foam aside for use.

7. The serpentine carbon sequestration foamed lightweight soil according to claim 1, wherein the sample prepared from step S5 must be completed within a half-life of the foaming agent to prevent the foam from bursting and causing the $CO_2$ to leak.

* * * * *